United States Patent [19]

Williams

[11] Patent Number: 4,802,552

[45] Date of Patent: Feb. 7, 1989

[54] COMBINED CLIMBING AND HANG-ON TREE STAND WITH OPTIONAL CLIMBING AID

[75] Inventor: Ralph D. Williams, Haughton, La.

[73] Assignee: Loggy Bayou Industries, Shreveport, La.

[21] Appl. No.: 78,677

[22] Filed: Jul. 28, 1987

[51] Int. Cl.$^4$ .......................... A45F 3/26; A47C 9/10
[52] U.S. Cl. ..................................... 182/187; 108/152
[58] Field of Search ............... 182/187, 188, 134, 135; 108/152

[56] References Cited

U.S. PATENT DOCUMENTS

| | | |
|---|---|---|
| 2,855,980 | 10/1958 | Konieczka . |
| 3,067,975 | 12/1962 | Wilcox . |
| 3,115,213 | 12/1963 | Cloutier . |
| 3,232,664 | 2/1966 | McBride . |
| 3,338,332 | 8/1967 | Brantly, Sr. . |
| 3,419,108 | 12/1968 | Mobbs . |
| 3,856,111 | 12/1974 | Baker ................................. 182/187 |
| 3,871,482 | 3/1975 | Southard . |
| 4,009,763 | 3/1977 | Hunter ................................ 182/187 |
| 4,150,733 | 4/1979 | Plummer . |
| 4,337,844 | 7/1982 | Hice .................................... 182/187 |
| 4,411,335 | 10/1983 | Forrester . |
| 4,413,706 | 11/1983 | Michael . |
| 4,427,092 | 1/1984 | Tentler . |
| 4,428,459 | 1/1984 | Peck . |
| 4,452,338 | 6/1984 | Untz . |
| 4,475,627 | 10/1984 | Eastridge . |
| 4,488,620 | 12/1984 | Gibson . |
| 4,582,168 | 4/1986 | Frey . |
| 4,589,522 | 5/1986 | Shelfon ............................... 182/187 |
| 4,596,309 | 6/1986 | Venson . |
| 4,597,473 | 7/1986 | Peck . |
| 4,625,833 | 12/1986 | Lewis ................................. 182/187 |

Primary Examiner—Reinaldo P. Machado
Attorney, Agent, or Firm—Nixon & Vanderhye

[57] ABSTRACT

A tree stand has a platform, a seat collapsible between a position overlying the platform and a position upstanding from the platform, and a climbing band for encircling the tree. The platform, seat and band engage the tree at three discrete points to afford stability. A safety rope is secured to the seat and has a Chinese knot for tightening the rope about the tree. A climbing aid is provided and includes a generally rectangular frame with one end frame member slidable toward and away from the opposite end frame member to adjustably lock in a selected position dependent upon the girth of the tree.

39 Claims, 8 Drawing Sheets

COMBINED CLIMBING AND HANG-ON TREE STAND WITH OPTIONAL CLIMBING AID

BACKGROUND AND SUMMARY OF THE INVENTION

The present invention relates to a tree stand and a climbing aid for use by hunters, naturalists, or the like. The invention particularly relates to a combination climbing and hang-on tree stand wherein the individual may use the stand a a platform for standing or sitting at the desired elevation in the tree, as well as for climbing the tree, and also to a climbing aid for facilitating climbing the tree.

Typically, a tree stand comprises a platform which is supported from the tree by a band which encircles the tree, thus affording a two-point support for the stand. For example, see U.S. Pat. No. 4,427,092. Such conventional platform is also designed to be secured to the climber's feet such that it can assist the climber to climb the tree. Particularly, the band and platform form a two-point engagement with the tree both during climbing and when used at the desired elevation. When used as a climbing aid, the band and platform are jointly alternately engaged and disengaged from the tree as the climber moves up the tree. For example, when the platform and band engage the tree and the platform is supported thereby, the climber supports himself from the tree otherwise than by the platform and rotates his feet to disengage the band and platform from the tree. He then raises his knees to raise the platform and strap to an elevated position, and then rotates his feet to engage the band and platform against the tree. By supporting himself on the platform, the climber then raises himself to a standing position and repeats this process until the desired elevation is achieved. At the desired elevation, the band and platform both engage the tree and form the two-point support.

Many tree stands provide only a platform and not both a platform for standing and a seat for sitting. In those constructions which afford a seat, it is either not an integral part of the platform or the tree stand is not capable for use as both a climbing and hang-on stand. Additionally, it will be readily appreciated that stability and security are paramount considerations when using a tree stand. It is also important that the tree stand not damage the tree, either in the course of climbing or hanging from the tree. Therefore, the use of prongs or other sharp pointed instruments for penetrating the surface of the tree are to be avoided. Also, many conventional tree stands are not sufficiently sturdy, are often heavy and bulky thereby inhibiting their transport, for example, as part of a backpack, and are difficult to carry up the tree. Further, the two-point contact with the tree affords only marginal platform stability and security when at the desired elevation.

Conventional climbing aids similarly use a two-point contact with the tree, directly in front of the individual climber and on the opposite side of the tree from the climber. This likewise affords very little stability and security. Also, these aids are usually adjustable to the girth of the tree by bolt and wingnut attachments for the releasable bar of the aid. This type of attachment inhibits ready and easy adjustment, is difficult to perform at night and permits the parts thereof to be readily lost.

According to the present invention, there is provided a novel and improved combination climbing and hang-on tree stand as well as a climbing aid which minimizes or eliminates the foregoing and other problems associated with prior tree stands and climbing aids and provides a novel and improved combination climbing and hang-on tree stand and climbing aid having various advantages in construction, operation and use, including substantial improved security and stability. Particularly, in accordance with the present invention, there is provided a tree stand comprised generally of a platform having a shallow V-shaped groove at one end for engagement about a tree, an adjustable, flexible climbing band which is secured at its opposite ends to opposite sides of the platform, and a collapsible seat which enables the stand with collapsed seat to be backpacked and affords, when the seat is extended into its upstanding operative position, a stable and secure three-point contact with the tree in conjunction with the V-shaped groove and band at the desired elevation.

More particularly, the collapsible seat includes a generally inverted U-shaped tubular element pivoted, at its distal ends, to support trusses along opposite sides of the platform, together with a similar, but shorter, U-shaped inverted tubular support pivoted at its distal ends intermediate the legs of the first-mentioned U-shaped element. Webbing is disposed between the bases of the U-shaped element and support and forms a seat therebetween. The seat is movable between a first collapsed position overlying and generally parallel to the platform and a locked upstanding position forming both a seat for the platform, as well as the third point of securement for securing the platform to the tree in addition to the platform notch and band. To accomplish this, a pair of telescoping support tubes are pivoted at their lower ends to the support trusses and at their opposite ends to the opposite legs of the U-shaped tubular element. The pivot points of the telescoping tubes and the U-shaped tubular element are spaced longitudinally one from the other along the platform whereby the telescoping rods may extend to enable the seat to pivot forwardly into its collapsed position overlying the platform and contract to enable the seat to pivot upwardly and rearwardly into its upstanding position. The telescoping tubes carry respective spring-biased pins and apertures whereby the tubes can be releasably locked in their retracted position, thus locking the seat in its upstanding position, and released to permit movement of the seat into its collapsed position. A plurality of apertures are provided such that the seat can be adjusted in its upstanding position.

A rope and hook attachment are provided for securing the upstanding seat against the tree when the stand is hung from the tree. This affords an additional and third point of securement and stability to the platform. The rope is adjustable in length and is secured to an adjustment mechanism carried by the seat whereby the rope can be mechanically tensioned and drawn taut about the tree.

A separate climbing aid is also provided and includes a generally rectangular frame having a back end frame member slidable toward and away from the front end frame member between selected adjusted positions along the side members of the frame. The back end frame member carries a pin mounted on a leaf spring on each of the opposite ends of the frame member for engagement in one of a plurality of apertures provided along the associated side frame member. Each of the front and back frame members carries a V-mount affording a four-point contact with the tree.

In using the tree stand and optionally the climbing aid hereof, the seat is collapsed to overlie the platform and may be transported by back straps carried by the platform to the desired location. The platform may be used as a climbing aid or may be otherwise carried or elevated to the desired elevation of the tree where it may be hung from the tree. To use the platform hereof as a climbing aid, the band is adjusted in length such that, when the platform is level and the band is disposed about the tree, the platform and band will engage the tree along opposite sides. The climber then steps onto the platform, inserts his toes below a bar forming part of the seat structure and his heels into the heel straps. The climber then grasps the tree or uses the climbing aid for support and angles his feet to incline the platform and thereby disengages the platform and band from the tree. The climber flexes his knees to elevate the platform, at which time the platform is returned to a level position whereby the band and platform engage the tree to support the climber. The climber then straightens up and grasps the tree or uses the climbing aid to engage the tree at a higher elevation. The climber then inclines the platform to effect disengagement of the platform and the band from the tree, enabling him to flex his knees, raising the platform to a next elevated position. The alternate engagement and disengagement of the platform and band with tree may be used by the climber as he proceeds up the tree to the desired elevation.

At the desired elevation, the platform is disposed in a level configuration and the climbing aid is located as far above the climber's head as possible in an out-of-the-way position. The seat is then pivoted upwardly from its collapsed position to an upstanding position which also locates the base of the inverted U-shaped element in engagement with the tree. The safety rope is disposed about the tree and secured to the hook. The rope, of course, is adjustable in length to accommodate trees of different girths. The tension of the rope may then be adjusted by the mechanical tensioning adjusting mechanism carried by the seat. Thus, it will be appreciated that the platform is in contact with the tree at at least three discrete points of engagement, namely, the base of the seat, the forward edge of the platform and the climbing band, thereby affording a highly stable and secure mounting for the stand. The safety rope or line essentially effects a four-point engagement with the tree. Where the tree stand has been otherwise carried up the tree than by using it as a climbing stand, the climbing band may be omitted entirely. Thus, a three-point contact with the tree is provided even without the climbing band, namely by the platform, seat and safety rope.

Accordingly, in one aspect of the present invention, there is provided a tree stand having a platform with opposite edges with one edge being engageable with the tree. Elongated means secured at its opposite ends to the platform and extendable about the tree for engagement with the other side of the tree from the platform are provided whereby the engagement is at an elevation above the elevation at which the one platform edge is engageable with the tree. A seat is carried by and upstanding from the platform and carries a bracing element for engagement with the tree whereby the tree stand is engageable with the tree at three discrete locations, affording support and stability to the stand. Preferably, the seat is collapsible to substantially overlie the platform. This is accomplished by mounting the seat by a pair of elements telescopically receivable one within the other, with one of the elements being pivotally carried at one end by the platform and the opposite end of the other element being pivotally connected to the seat. A locking means, including means for retaining the elements in a predetermined telescoping relation one with the other when the seat lies in its upright position is also provided.

Another aspect of the present invention provides a tree stand comprising a platform having opposite edges with one of said edges engageable with a tree, a seat carried by the platform and movable between a first collapsed position adjacent the platform and a second position upstanding from the platform, and means for securing the platform to the tree at the desired elevation therealong with the platform and the seat in engagement with the tree whereby the securing means, the platform and the seat engage the tree at three discrete locations along the tree affording support and stability to the stand when hung from the tree.

A further aspect of the present invention provides an aid for climbing a tree comprising a rigid frame including a pair of generally parallel side frame members spaced laterally one from the other and discrete front and back members, the front member extending between the side members at a location inset from the ends of the side members along the front side of the frame, the back member being releasably secured at opposite ends to the side members at selected positions therealong for adjustably spacing the back frame member relative to the front frame member whereby the frame may be disposed about trees of different girths with the front and back members on opposite sides of the tree, each of the front and back members having a generally V-shaped surface for bearing against the tree to establish four laterally spaced points of contact therewith.

A still further aspect of the present invention provides a transportable combination tree stand and climbing aid comprising a platform, a seat assembly carried by the platform and movable between a position upstanding from the platform and a collapsed position substantially overlying the platform, means carried by the stand for securing the stand to a tree, a climbing aid for assisting a climber to climb a tree independently of the tree stand and including a frame for gripping the tree, the climbing aid frame overlying the platform when the seat lies in the collapsed position and means carried by the platform for securing the frame and the platform one to the other when the seat is collapsed overlying the platform.

Accordingly, it is a primary object of the present invention to provide a novel and improved tree stand which is simple in construction, lightweight, may be used interchangeably as a climbing stand or a hang-on stand, provides a safe secure stable three-point engagement with the tree, affords a unique climbing band and band guide locking system, and has various other safety and practical features which will become apparent from the ensuing description.

Another object of the present invention is to provide a novel and improved climbing aid for use in assisting the climber to climb the tree.

These and further objects and advantages of the present invention will become more apparent upon reference to the following specification, appended claims and drawings.

DETAILED DESCRIPTION OF THE DRAWING FIGURES

Reference will now be made in detail to the present preferred embodiment of the invention, an example of which is illustrated in the accompanying drawings.

Referring now to FIGS. 1 through 4, there is illustrated a tree stand, constructed in accordance with the present invention, generally designated 10. Tree stand 10 generally includes a rigid platform 12 which supports a seat assembly 14 for pivotal movement between an upstanding position (FIG. 3) and a collapsed position (FIG. 4), and a band guide and climbing band locking assembly 16. Platform 12 generally comprises a rectangular frame having side frame members 18 spaced laterally one from the other, a front end frame member 20 interconnecting corresponding ends of side members 18 one to the other, and a notched end bar 22 joining the opposite ends of side members 18 one to the other at the rear of the frame. Side members 18 are generally inwardly directed channel members, while end members 20 and 22 comprise rectangular bars. A shallow V groove 24 is formed in rear end bar 22 and a resilient material 25, preferably rubber, is provided along the rear edge of end bar 22 to bear against and provide traction with the tree in a manner which eliminates noise and does not damage the tree. A plurality of slats 26 are spaced longitudinally one from the other along the platform, their opposite ends being disposed within channel members 18. Each of the slats is provided with a non-skid platform surface material 28.

A pair of longitudinal bracing elements 30 are provided along the underside of slats 26 and interconnect end bars 20 and 22. A pair of straps or webs 31 are loosely provided along the underside of the platform, the straps being adjustable to facilitate backpacking the tree stand when seat 14 is in its collapsed position illustrated in FIG. 4. Heel straps 47 are also provided extending forwardly from one of slats 26.

Platform 12 also includes a pair of upstanding support trusses 32 along opposite sides thereof. Each support truss includes an upwardly inclined frame member 33 extending from the front end of platform 12 to an apex, where it joins with a more sharply angled frame member 34 secured to the rear end of platform 12. Frame members 33 and 34 support seat assembly 14 and, in part, the band guide and climbing band locking system 16. Additional braces 36 connect between side frame members 18 and members 33.

Figure 3:
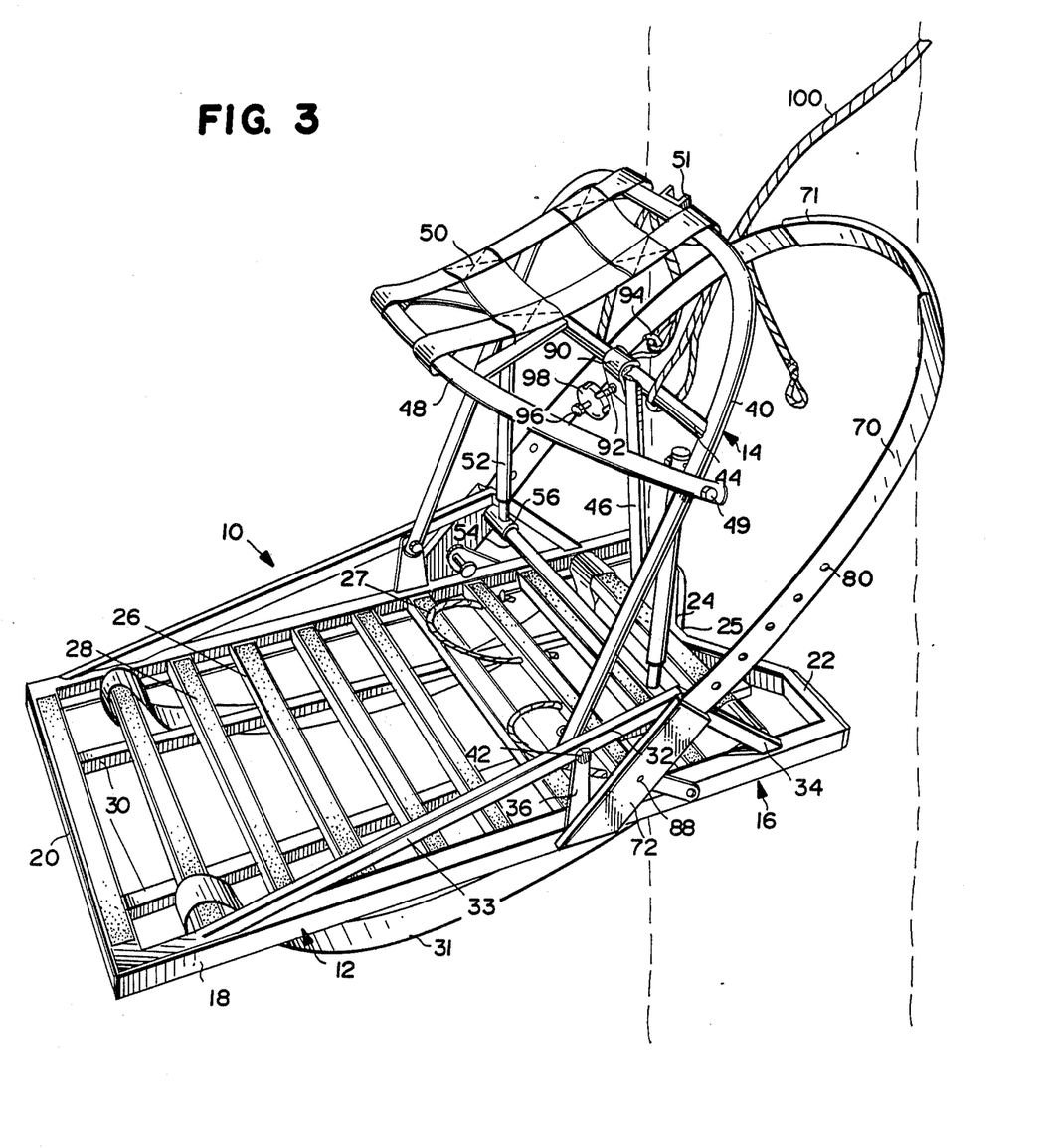
FIG. 3 is an enlarged perspective view of the tree stand of the present invention with its seat unfolded and the stand in operative position in three-point contact with the tree at the desired elevation.

Seat assembly 14, as illustrated in FIG. 3, includes a generally inverted U-shaped element 40 pivotally secured to trusses 32 at its lower ends by bolts 42 which extend through the juncture of frame members 33 and 36. A crossbar 44 extends between the legs of element 40 and is suitably braced by members 46 extending between the legs of element 40 and crossbar 44. A shorter, generally U-shaped, support 48 is pivotally secured at its opposite ends intermediate the length of element 40 by means of bolts 49. Webbing 50 extends between the base portions of element 40 and support 48 to form a seat when seat assembly 14 lies in the upstanding position illustrated in FIG. 3. It will be appreciated that the support 48 may be pivoted between its extended position to form the seat and a collapsed position against element 40 to collapse webbing 50. For reasons discussed hereinafter, a channel-shaped segment 51 projects from the rear side of element 40.

To lock seat assembly 14 in an adjusted upstanding position (FIG. 3) such that the seat may form part of a three-point support for the stand when used as a hang-on stand, as described in detail hereinafter, a pair of telescoping tubes 52 are provided for connection between platform 12, particularly trusses 32, and seat assembly 14. Particularly, a crossbar 54 extends across platform 12 between trusses 32 and is secured in a manner set forth below. Tubular ends 56 of telescoping tubes 52 are disposed about crossbar 54 for pivotal movement relative thereto, while the upper ends of the telescoping tubes 52 are pivotally secured to element 40 and support 48 by bolts 49. When seat assembly 14 is in its upstanding condition, each telescoping tube lies in the illustrated contracted position, whereas when seat assembly 14 is in its collapsed position (FIG. 4), each telescoping tube is extended.

Figure 6:
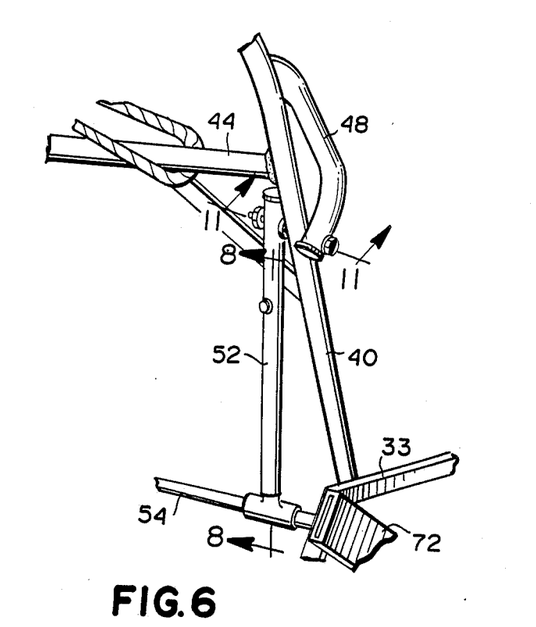
FIG. 6 is a perspective view of the telescoping connection between the seat and platform.
Figure 7:
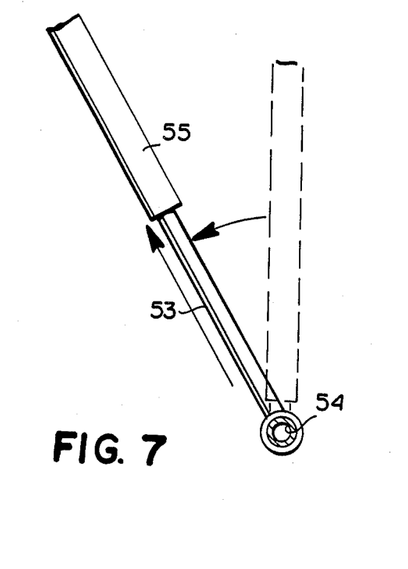
FIG. 7 is an enlarged side elevational view illustrating the telescoping rods in extended positions for collapsing the seat and in a contracted position (dashed lines) with the seat in its upstanding position.
Figure 8:
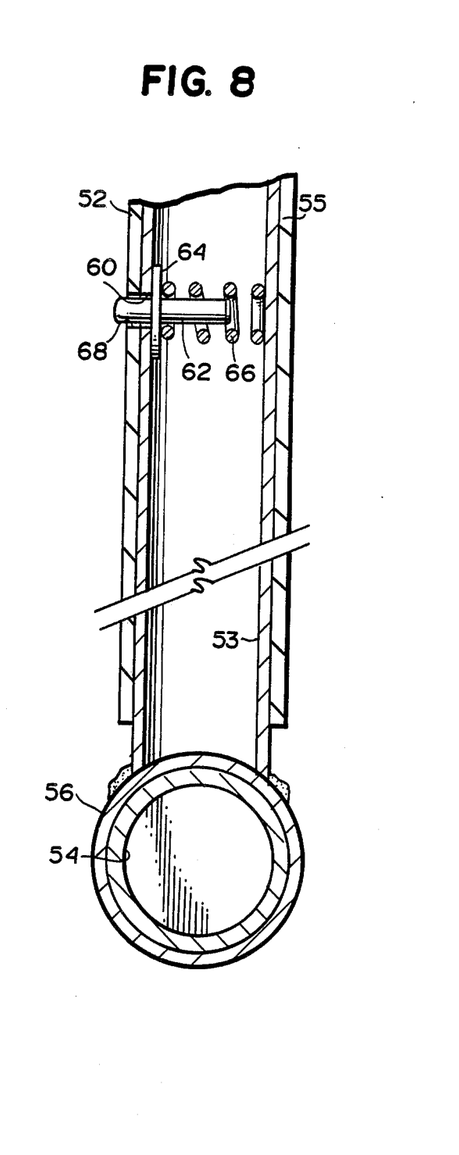
FIG. 8 is an enlarged cross-sectional view of the telescoping connection and a retention means taken generally line 8—8 in FIG. 6.

Referring to FIGS. 6 and 8, the upper ends of the telescoping tubes are provided with springloaded pins whereby the seat may be adjustable into one of two or more positions, as desired. Particularly, the inner tube 53 of each telescoping tube 52 is provided with an aperture 60 for receiving a pin 62, pin 62 integrally mounting a washer 64. A spring 66 within each inner tube 53 biases the pin 62 to project through aperture 60 and washer 64 prevents loss of pin 62 through the aperture. A plurality of apertures 68 are disposed along the length of the outer tube 55 of each telescopic tube 52 whereby the telescopic extent of tubes 52 can be adjusted depending upon the aperture 68 into which pin 62 is disposed. It will be appreciated from a review of FIG. 3 that element 40 may be pivoted to a greater or lesser extent depending upon the telescopic extent of frame 52 whereby the base portion of element 40 is moved or adjusted toward or away from the tree.

Figure 11:
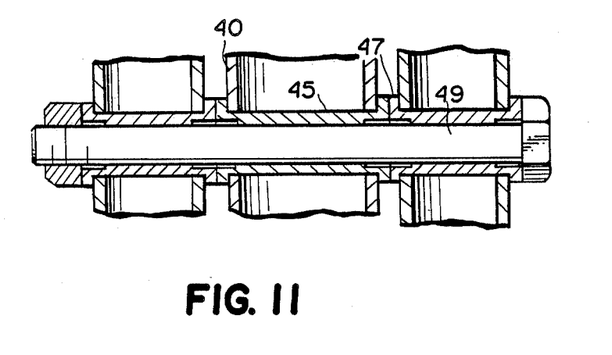
FIG. 11 is a cross-sectional view illustrating the juncture of the telescoping members and the seat frame taken generally about on line 11—11 in FIG. 6.

As illustrated in FIG. 11, holes are formed through element 40, support 48 and tube 55 on each side of seat assembly 14. A bushing 45 having radially enlarged ends 47 is provided each hole. Bolt 49 is received in the bushings. The bushings prevent enlargement of the holes and afford a pivotal action without noise or squeaks.

Figure 4:
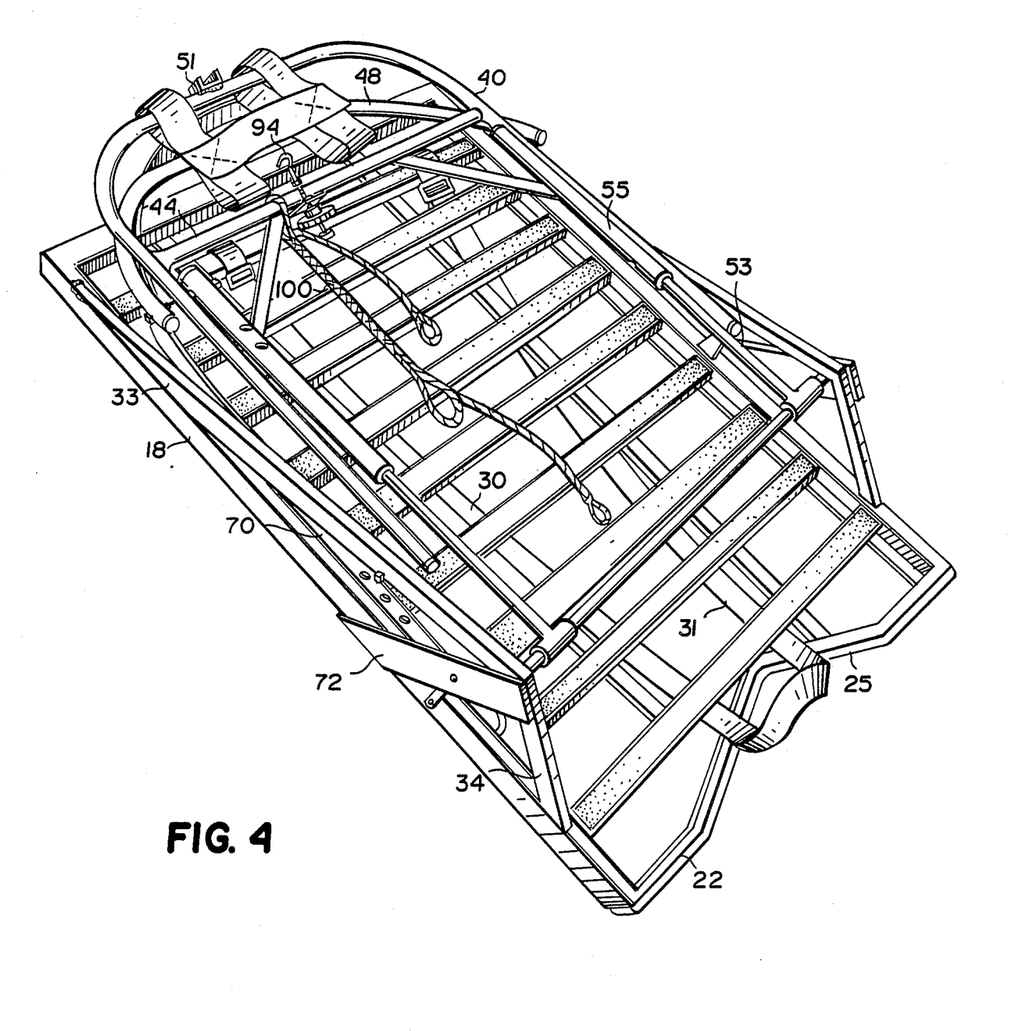
FIG. 4 is a perspective view of the tree stand hereof illustrated in a collapsed condition.

To move seat assembly 14 from its upstanding position illustrated in FIG. 3 to its collapsed position illustrated in FIG. 4, pins 68 are displaced inwardly against the bias of spring 66 to release tubes 53 and 55 for telescopic movement. Seat support 48 may be pivoted about bolts 49 to lie substantially in the plane of element 40. Element 40 may then be pivoted about crossbar 54 to collapse seat assembly 14 into a position generally parallel with the platform 12, as illustrated in FIG. 4.

To extend seat assembly 14 from its collapsed position into its upright position illustrated in FIG. 3, element 40 is pivoted about crossbar 54 into the position illustrated in FIG. 3. When pins 62 align with the first aperture 68 in outer tubes 55, pins 62 automatically extend into and seat in such apertures, locking seat assembly 14 in its upright condition. If a further adjusted position is required, pins 62 may be manually depressed against the bias of springs 66 and element 40 may be pivoted further to locate the pins for engagement in the additional apertures 68. Any number of apertures may be provided and it will be appreciated that the selection of a particular aperture determines the rearward extent of the base of element 40 vis-a-vis the notched bar 22.

The band guide and climbing band locking system 16 for climbing band 70 includes band guides 72 secured along the outside of side frame members 18. Band guides 72 incline upwardly and rearwardly, as illustrated and are secured at one end to members 18 and at their opposite ends to truss members 33 and 34. The opposite ends of crossbar 54 are also secured to band guides 72. Each band guide 72 is provided with an elongated through slot 78 (FIG. 10) for receiving an end of climbing band 70. As illustrated in FIG. 3, the opposite ends of climbing band 70 have a plurality of apertures 80 spaced one from the other. Climbing band 70 is also provided with a resilient, preferably rubber, pad 71 for engaging the tree without damaging it.

Figure 9:
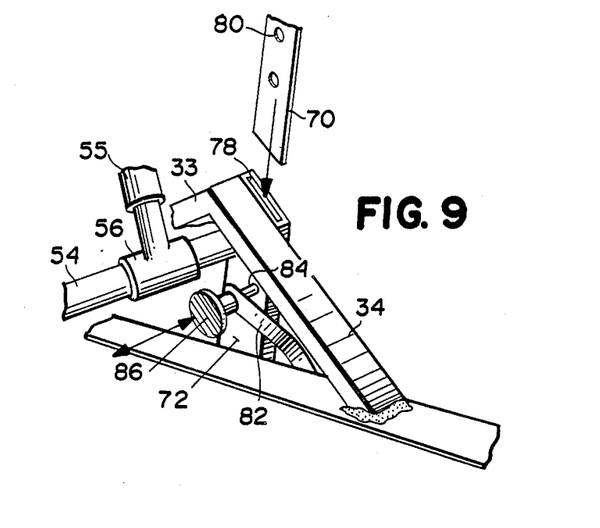
FIG. 9 is a fragmentary perspective view illustrating the releasable locking system between the climbing band guide.
Figure 10:
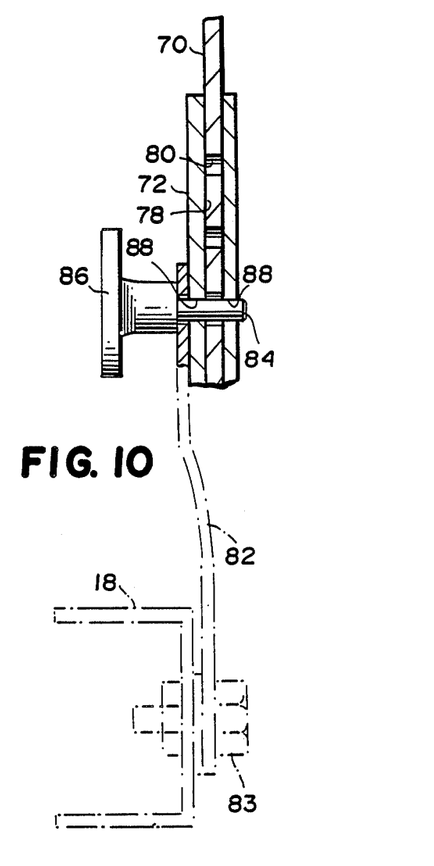
FIG. 10 is a fragmentary enlarged cross-sectional view illustrating the climbing band and band guide locking system for locking the climbing band in a position.

As illustrated in FIGS. 9 and 10, a pair of leaf springs 82 are pivoted at one end to side frame members 18 by bolts 83. Springs 82 are bent inwardly and terminate at their free ends in pins 84, the side of each leaf spring 82 opposite pin 84 carrying a handle 86. Aligned openings 88 are provided through the opposite sides of support members 72 for receiving pins 84. Thus, by grasping handles 86 on leaf springs 82 and withdrawing pins 84 from openings 88, the ends of climbing band 70 may be received in slots 78. When the ends of band 70 have been inserted in slots 78 to the desired extent, handles 86 may be released such that pins 84 extend through registering apertures 80 of band 70 and 88 of support member 72 to secure band 70 in an adjusted position. The leaf springs are pivotable at bolts 83 and this facilitates finding the holes 88 for pins 84, especially when attaching the climbing band in the dark.

When climbing band 70 is not in use, it may be released from the band support members 72 by withdrawing pin 84 from the engaged aperture 80. The band may then be placed on top of platform 12 in a generally parallel relation thereto. That is, the ends of band 70 carrying apertures 80 are located inside adjacent band guides 70 whereby pins 84 may be inserted through openings 80 and into opening 88 to secure the band to the stand. It will be appreciated that the collapsed seat assembly 14 overlies band 70 in this position and maintains it parallel to the platform.

Figure 15:
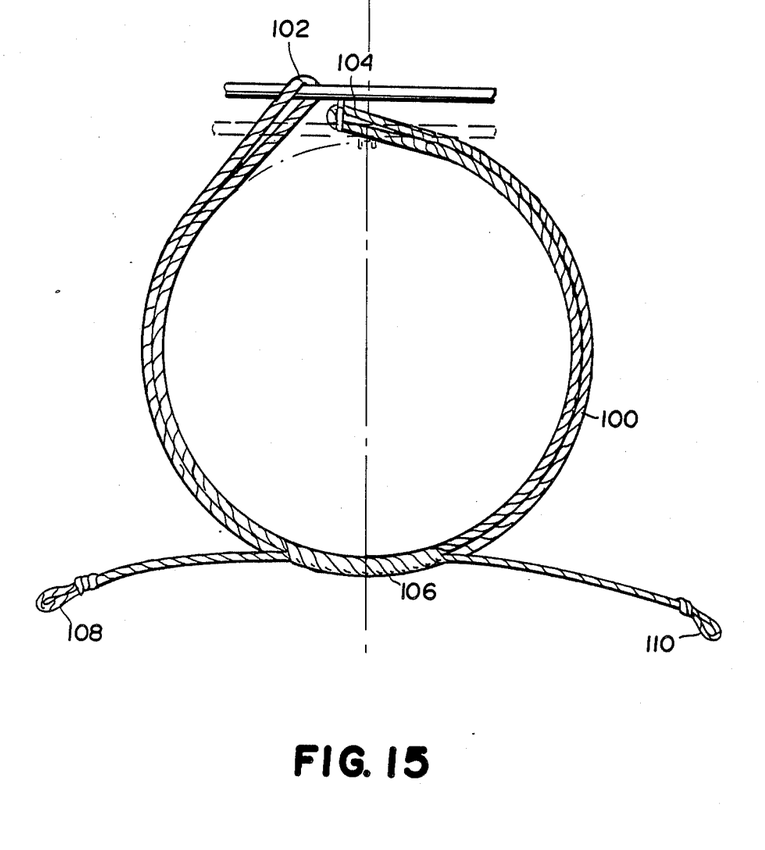
FIG. 15 is an enlarged view illustrating the use of the safety rope securing the tree stand to a tree.

Referring now to FIGS. 3 and 15, the tree stand hereof is provided with a safety rope and an adjustable assembly for tightening the safety rope about the tree, thereby securing the tree stand to the tree in a taut, stable condition. Referring particularly to FIG. 3, a bracket 90 is secured to crossbar 44 intermediate brace members 46. A threaded pin 92 slidably extends through a bushing fixed in an aperture through bracket 90. Pin 92 terminates at opposite ends in a hook 94 and a head 96. An adjusting wheel 98 is threadedly received on pin 92 between head 96 and bracket 90. By threading wheel 98 up to bracket 90, the extent of the rearward projection of hook 94 from bracket 90 may be adjusted.

Safety rope 100 has large looped ends 102 and 104, looped end 102 being secured about crossbar 44, while looped end 104 is for reception within hook 94 of pin 92. Safety rope 100 has a "Chinese knot" 106 substantially medially between the looped ends 102 and 104 and another pair of looped ends 108 and 110 extend from knot 106. By pulling both ends 108 and 110, safety rope 100 may be tightened about the tree, as will be described. To loosen the rope 100, one end 108 or 110 may be pulled and this will afford slack in the rope for reasons described hereinafter. It will be appreciated, however, that the "Chinese knot" will maintain the rope against any effort to enlarge its diameter other than by pulling one of the rope ends 108 and 110.

Figures 12, 13:
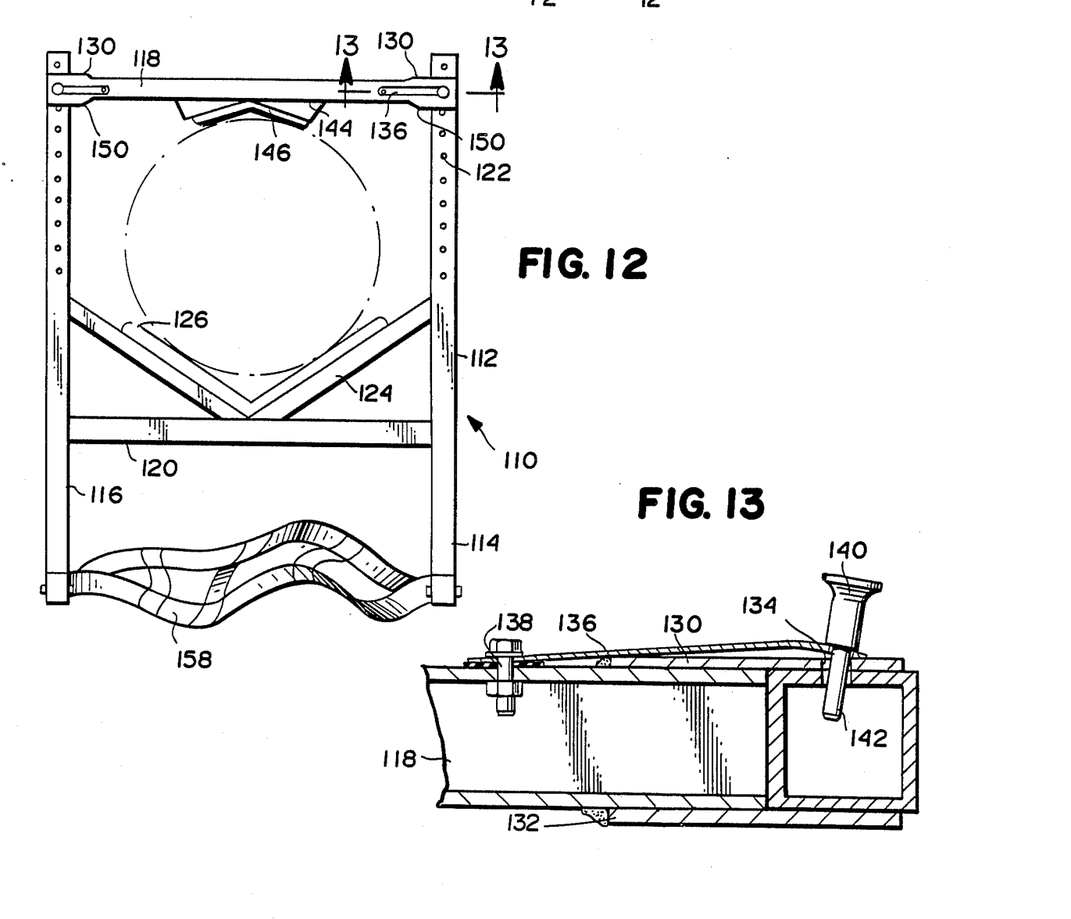
FIG. 12 is a plan view of a climbing aid constructed in accordance with the present invention and which may be used in conjunction with the tree stand hereof.
FIG. 13 is an enlarged fragmentary cross-sectional view taken generally about on line 13—13 in FIG. 12.

Referring now to FIGS. 12 and 13, there is provided a climbing aid, generally designated 110, comprised of a rigid frame 112, having parallel side frame members 114 and 116 and discrete back and front members 118 and 120, respectively. Side frame members 114 and 116 are generally of square tubular construction having spaced apertures 122 along one face thereof adjacent end frame member 18. End frame member 120 is rigidly secured between side frame members 114 and 116 inset from the front end of the climbing aid. A pair of generally diagonally extending braces 124 secured between end frame member 120 and side frame members 114 and 116, forming a V groove. The groove is lined with a resilient, preferably rubber, material 126 for engaging the tree at two discrete locations.

The end frame member 118 is of square tubular construction having a pair of plates 130 and 132 projecting from its opposite ends. As illustrated in FIG. 13, end member 118 terminates short of side frame members 114 and 116, whereby it may be slidably received between such members with the plates 130 and 132 serving as guides overlying and underlying, respectively, the opposed surfaces of side frame members 114 and 116. Plate 130 has an aperture 134. A leaf spring 136 is pivotably secured at one end by a bolt 138 to end frame member 118 and terminates at its distal end in a handle 140 and a pin 142. The pin 142 is biased by spring 136 for reception in aperture 134 and one of a registering aperture 122 of side member 112. In this manner, end frame member 118 may be slidably displaced along the length of frame 112 and disposed and locked in an adjusted position. End frame member 118 similarly has a pair of diagonally extending braces 144, each mounting a resilient, preferably rubber, material 146, affording contact with the tree at discrete spaced locations.

From the front side of frame 112, there is provided webbing 150 secured at opposite ends to the distal ends of side frame members 114 and 116. Webbing 150 is designed for disposition about the back of a climber or for use as a seat, depending upon the manner in which the climber intends to climb the tree.

Figure 14:
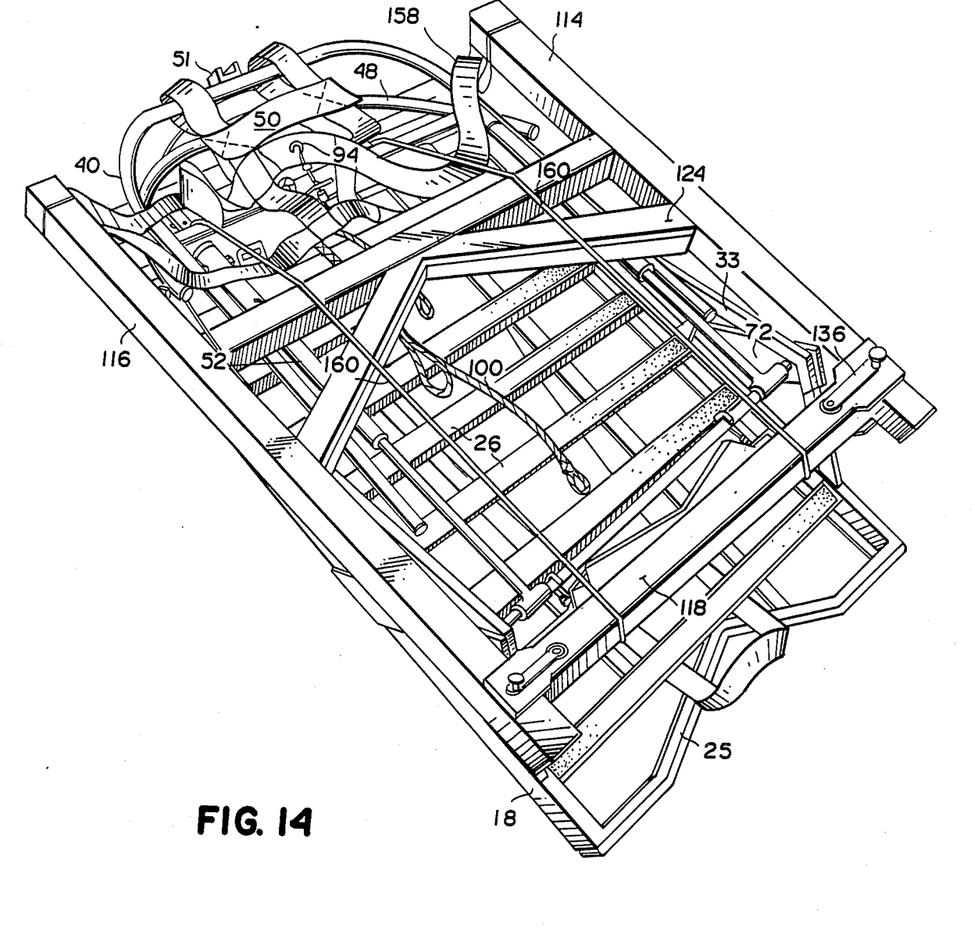
FIG. 14 is a view similar to FIG. 4 illustrating the climbing aid of FIG. 12 attached to the tree stand with the seat in its collapsed position, the tree stand and the climbing aid being configured for transport as a backpack.

Referring now to FIGS. 4 and 14, the tree stand hereof, with or without the climbing aid, may be collapsed into a position for transport, for example, as a backpack carried by the climber. In FIG. 4, seat assembly 14 may be collapsed into a position generally overlying and lying parallel to the platform 12 by depressing pins 62 of the telescoping members 52 inwardly such that the seat frame pivots from the position illustrated in FIG. 3 to the position illustrated in FIG. 4. The seat frame 48 is, of course, initially pivoted about bolts 49 into generally co-planar relation with element 40 prior to pivoting seat assembly 14 into the position illustrated in FIG. 4. Thus, seat assembly 14 overlies band guide 70 in the collapsed condition. Elastic cords, not shown in FIG. 4, but shown at 160 in FIG. 14, may be used to secure the seat assembly in the collapsed condition, there being provided apertures in the frame elements 30 adjacent the notched end of the platform by which ends of the elasticized cords may be attached to the stand. The opposite ends may be provided with hooks for hooking over various elements of the stand. It will be appreciated that seat assembly 14 and climbing band 70 lie on the opposite side of the platform in the collapsed position thereof from backpack straps 31. With the stand in the collapsed condition illustrated in FIG. 4, it may be strapped onto the back of an individual for transport to the climbing site.

Referring to FIG. 14, tree stand 10 and climbing aid 110 are designed to interfit to facilitate backpacking the tree stand and climbing aid. From a review of FIG. 12, it will be seen that plates 132 are slightly larger than the width of the end frame 118 whereby the inside portions thereof form projections 150. Band guides 72 project slightly beyond the faces of frame members 34 to form therewith a notch. Climbing aid 110 is disposed to overlie seat assembly 14 in its collapsed position with projections 150 engaging these notches. Elastic cords 160 may then be disposed, from the rear of platform 12, particularly bracing elements 30, over the climbing aid and hooked to crossbar 54 to secure the climbing aid to the tree stand with projections 150 engaging in the notches. In this manner, the combined tree stand and climbing aid may be transported in the manner of a backpack to the climbing site.

At the climbing site, the climber may use the climbing aid or the tree stand as a climbing stand without the climbing aid or both or may use the climbing aid without the tree stand by simply climbing the tree with the climbing aid and hoisting the tree stand to the desired elevation. To climb the tree using the tree stand as a climbing stand and without the climbing aid, seat assembly 14 is maintained in its collapsed condition. The ends of the climbing band 70 are inserted through band guides 72 and locked by pins 84 in an adjusted position depending upon the diameter of the tree. It will be appreciated that leaf springs 82 are pivotally mounted, thereby facilitating insertion of pins 84 into apertures 88 in band guides 72 and, because of the spring bias, will snap into the registering apertures 80 of climbing band 70. The climbing stand is disposed at an elevation above the ground for support on the tree with the V groove 25 of the platform and the back of climbing band 70 engaging the opposite sides of the tree. The climber then disposes his toes below the crossbar 54 and inserts his feet into the heel straps. By grasping the tree to support himself and the stand, and then inclining the platform, the platform and band are released from the tree. By raising his legs and flexing at the knees, the stand may be raised along the tree. When his knees are fully flexed, the platform is disposed in a general horizontal position to engage the band and V on opposite sides of the tree to support the climber. The climber may then extend his body full-length to repeat the process until the desired elevation is reached.

Figure 1:
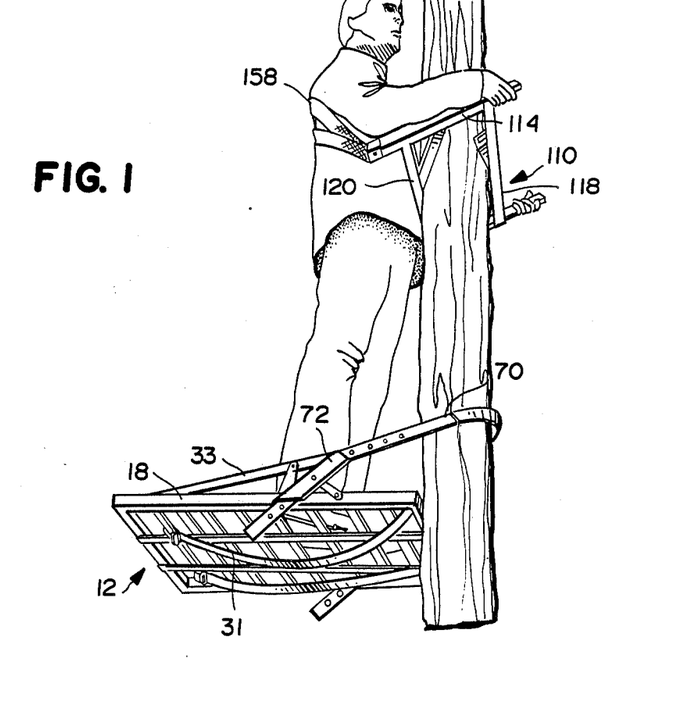
FIGS. 1 and 2 are perspective illustrations of a tree stand and climbing aid constructed in accordance with the present invention illustrating their use in various positions when the tree stand is employed as a climbing stand.
Figure 2:
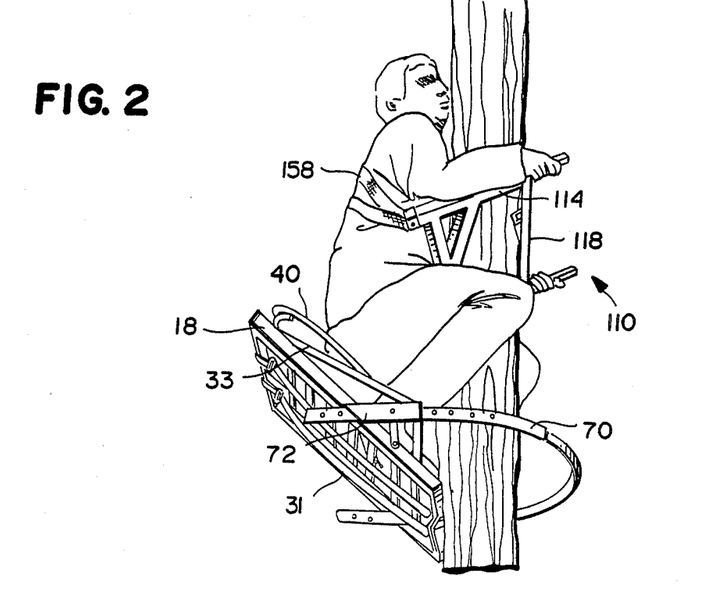

Alternately, the climber may use the climbing aid by first removing end frame member 118 from frame 112 and disposing side members 114 and 116 about the tree. Frame member 118 is then secured to side frame members 114 and 116 in an adjusted position, leaving sufficient distance between frame members 118 and 120 such that the climbing aid may be alternately moved between horizontal and inclined positions necessary to enable the individual to climb the tree. The climber may slip the web 150 over his body to engage his back with his body between web 150 and fixed end frame 120. Thus, when the climber stands on the tree stand, as illustrated in FIG. 1, the climbing aid may be moved up the tree to an inclined position, as illustrated. The climber, as illustrated in FIG. 2, may then flex his knees to disengage the notched groove and climbing band from the tree, raise the tree stand by flexing his knees upwardly, and return the tree stand to a horizontal position to provide support. With the tree stand horizontal, the climber then moves the climbing aid into a position, i.e., horizontal position, to disengage the climbing aid from the tree, and stands full height, raising the generally horizontally disposed climbing aid along the tree, whereupon the process is repeated.

At the desired elevation and with the climber supported on the stand, the climbing aid may be moved upwardly above the climber along the tree and inclined, whereupon it will remain in position until the climber desires to climb down the tree.

Figure 5:
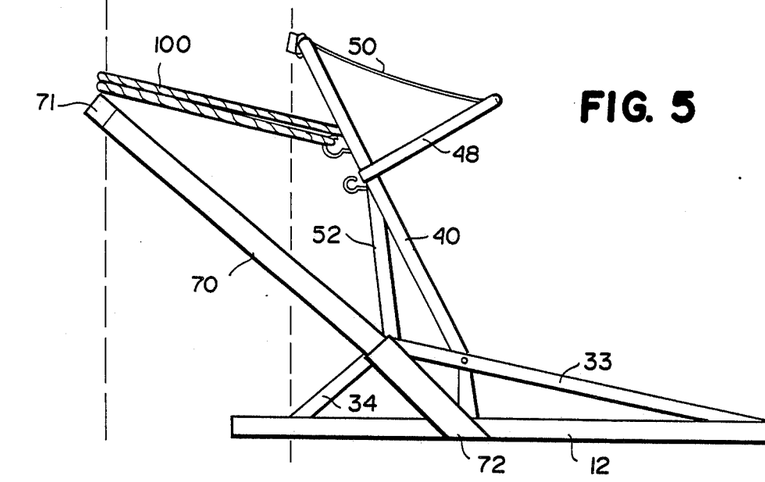
FIG. 5 is a schematic side elevational view of the tree stand hereof positioned on a tree.

At the desired elevation, the climber may unfold the seat by pivoting it into its upright position illustrated in FIG. 3, taking care to lock the telescoping members in their locked positions with pins 62 engaging through apertures 60 and 68. The stand is designed and configured to provide a three-point contact with the tree when the seat is in use, i.e., the V notch 25 of the platform, the back of climbing band 70, and channel 51 on the back of seat element 40, as illustrated in FIG. 5. Channel 51 affords lateral stability when engaged against the tree, i.e., security against tipping the platform about its long axis. It also affords security by preventing pivoting movement of the platform when an individual's weight is concentrated at the rear end of the platform, i.e., between crossbar 54 and the tree. Should channel 51 not engage the tree upon extension of seat assembly 14 into its upright position, pins 62 may be depressed and telescoping tubes 52 further contracted whereby pins 62 may be received in additional apertures. This adjustment tends to pivot the seat toward the tree, enabling channel 51 to engage the tree.

For additional safety, safety rope 100 is extended about the tree. First, hook 94 is pushed through its bushing toward the tree to its maximum extent. The large end 104 of rope 100 is then hooked over hook 94. The looped ends 108 and 110 are then drawn away from one another to draw rope 100 tightly about the tree. The Chinese knot 106 is such that when the rope is taut, the knot will not slip. Wheel 98 is then rotated to draw hook 94 away from the tree and toward the platform whereby the safety rope 100 may be further tightened about the tree. Consequently, when using safety rope 100, stand 10 remains highly stabilized against forward and backward tipping, as well as lateral tipping movement, by the three-point contact, with the safety rope 100 serving as additional securement and safety.

Should the climber hoist the stand to the desired elevation rather than use it as a climbing stand, climbing band 70 may remain on the platform in the position illustrated in FIG. 4. Once the stand is at the desired elevation and with the climber supporting himself from the tree, seat assembly 14 is moved to its upright position. Safety rope 100 is then disposed about the tree and drawn taut, whereby channel 51 and V notch 24 engage the tree. Thus, a three-point, highly stable and secure mounting to the tree is provided.

Should the platform not lie level at the desired elevation, either because the diameter of the tree has changed substantially from the diameter at its base or because the climbing band was not initially adjusted properly, the flexiblity of the climbing band hereof enables adjustment of the platform to the horizontal while at the desired elevation. The climbing band is formed of spring steel and is flexible. Thus, the front of the platform can be adjusted upwardly by flexing the band while the band remains in engagement with the backside of the tree. Likewise, if the platform tilts toward the tree, the V-notch can be disengaged from the tree to level the platform by flexing the band.

To remove the tree stand using it as an aid in climbing down the tree, one end 108 or 110 of the safety rope is pulled, thereby effecting a loosening of the safety rope 100 about the tree. The looped end 104 may then be released from the hook and the rope 100 secured in an out-of-the-way position. The climbing aid 110 is then brought down into position to support the climber. When he supports himself from the climbing aid, seat assembly 14 is then collapsed. The climber then inserts his toes below crossbar 54 and his heels in the heel straps 27. The climber then reverses the process used when climbing the tree to get down the tree.

The climbing stand hereof is formed of welded aluminum parts rendering it very light in weight, i.e., about 10¾ pounds. Movable parts are provided gaskets or bushings to extend wear and reduce noise. The platform is also relatively long, i.e., about 30.5 inches, enabling, for example, a bow hunter standing on the front of the platform to swing his bown and arrow to either side of the tree. The platform surfaces are non-skid and the various movable parts are integral with the stand and thus cannot be lost. For example, springbiased pins are used to adjust the climbing band and climbing aid and these elements form an integral part of the stand rather than loose parts, such as wingnuts and bolts which can easily be lost.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A tree stand comprising:
 a platform having opposite edges with one edge engageable with a tree; said
 elongated means secured at its opposite ends to platform and extendable about the tree for engagement with the other side of the tree from the platform and at an elevation above the elevation at which the one platform edge is engageable with the tree; and
 a seat carried by and upstanding from said platform, and said seat having a frame element for engagement with the tree at an elevation therealong different from the elevation of the engagement of the tree stand platform and said elongated means, whereby the tree stand is engageable with the tree at three discrete elevationally different locations affording support and stability to the stand.

2. A tree stand according to claim 1 wherein at least two of said platform, said seat and said elongated means carry a resilient element for engagement with the tree.

3. A tree stand according to claim 1 wherein said seat is collapsible to substantially overlie said platform.

4. A tree stand according to claim 1 wherein said seat is pivotally carried by said platform for movement between a first collapsed position adjacent said platform and a second position upstanding from said platform for engagement with the tree, and means carried by said platform for locking and seat against pivotal movement in said second position.

5. A tree stand according to claim 1 wherein said elongated means includes an elongated flexible band and means carried by said platform and engagable with said band at selected positions therealong for adjusting the extent of said band from said platform, said band extending from the opposite sides of said platform in a plane, said band being flexible when engaged with the tree for movement out of the plane.

6. A tree stand according to claim 5 wherein said flexible band has a resilient element for engagement with the tree.

7. A tree stand according to claim 5 wherein said adjusting means includes a pin for engagement in one of a plurality of openings carried by said band and means for biasing said pin for movement in a direction for reception in said openings.

8. A tree stand according to claim 7 wherein said biasing means includes a leaf spring pivotally secured to said platform at one end and mounting said pin adjacent its opposite end, said adjusting means further including a band guide having opposed walls defining a slot therebetween for receiving an end of said band and an aperture through each wall for registry with said pin and one of said band openings to secure said band and platform one to the other.

9. A tree stand according to claim 7 wherein said band is movable between a position extendable about said tree and a position overlying said platform in generally parallel relation therewith, said pin in the latter position of said band engaging in one of the plurality of openings carried by said band, said seat being pivotally carried by said platform for movement between a first collapsed position overlying and generally parallel to said platform and generally parallel to said band and a second position upstanding from said platform for engagement with the tree, and means for locking said seat in said second position.

10. A tree stand according to claim 1 including a safety rope for encircling the tree and engageable with said seat at its opposite ends to secure the stand to the tree.

11. A tree stand according to claim 14 wherein said seat carries an adjustable connection for securing one end of said rope to said seat and means carried by said seat for adjusting the extent of said connection relative to said seat for tightening said rope when the latter encircles the tree.

12. A tree stand comprising:
a platform having opposite edges with one edge engageable with a tree;
elongated means secured at its opposite ends to said platform and extendable about the tree for engagement with the other side of the tree from the platform and at an elevation above the elevation at which the one platform edge is engageable with the tree;
a seat carried by and upstanding from said platform and carrying a bracing element for engagement with the tree whereby the tree stand is engageable with the tree at three discrete locations affording supporting and stability to the stand, said seat being pivotally carried by said platform for movement between a first collapsed position adjacent said platform and a second position upstanding from said platform for engagement with the tree;
a pair of elements telescopically receivable one within the other with one of said elements being pivotally carried at one end by said platform and the opposite end of the other element being pivotally connected to said seat; and
means for locking said seat in said second position including means for retaining said elements in a predetermined telescoping relation one with the other when said seat lies in said second position.

13. A tree stand according to claim 12 wherein said retaining means includes a pin carried by one of said elements and an aperture in the other of said elements for receiving said pin and means for biasing said pin for movement in a direction for disposition in the aperture in said other element.

14. A tree stand according to claim 12 wherein said seat includes a generally U-shaped element pivotally connected at its distal ends to said platform, said one element being pivotally connected to said platform at a location therealong between said one edge and the pivotal connection of said U-shaped element and said platform, said U-shaped element lying in a plane generally parallel to said platform, when said seat is pivoted into said first position with said telescoping elements extended relative to one another.

15. A tree stand according to claim 14 wherein said seat further includes a second generally U-shaped support pivotally connected at its ends to the legs of said first mentioned element intermediate their lengths and seat material extending between base portions of said U-shaped element and said U-shaped support.

16. A tree stand comprising:
a platform having opposite edges with one of said edges engageable with a tree;
a seat carried by said platform and movable between a first collapsed position adjacent said platform and a second position upstanding from said platform; and
means for securing said platform to the tree at the desired elevation therealong with said platform and said seat, when in said second position thereof, in engagement with the tree whereby said securing means, said platform and said seat engage the tree at three discrete locations along the tree affording support and stability to the stand when hung from the tree.

17. A tree stand according to claim 16 wherein said securing means includes an elongated climbing band secured at opposite ends to said platform intermediate said edges and extendable about the tree for engagement with the other side of the tree from the platform.

18. A tree stand according to claim 16 wherein said securing means includes a flexible line having opposite ends secured to said seat and extending about the tree.

19. A tree stand according to claim 18 including means carried by said seat for tightening the line about the tree when said stand is hung from the tree.

20. A tree stand according to claim 18 including means carried by said line at a location intermediate the points of securement of said line to said seat for adjusting the length of said line.

21. A tree stand according to claim 16 wherein said platform is elongated and comprises a pair of elongated support members spaced laterally one from the other and extending along opposite sides of said platform between its opposite edges, said members comprised of channels having flanges and opening laterally inwardly toward one another, and a plurality of laterally extending, longitudinally spaced, support elements each having a generally rectilinear cross-section, the opposite ends of which are received within the channels of the members between said flanges.

22. A tree stand comprising:
a platform having opposite edges with one of said edges engageable with a tree;
a seat carried by said platform and movable between a first collapsed position adjacent said platform and a second position upstanding from said platform; and
means for securing said platform to the tree at the desired elevation therealong with said platform and said seat, when in said second position thereof, in engagement with the tree whereby said securing means, said platform and said seat engage the tree at three discrete locations along the tree affording support and stability to the stand when hung from the tree, said seat including a pair of elements telescopically receivable one within the other with one of said elements being pivotally carried at one end by said platform and the opposite end of the other element being connected to said seat, and means for locking said seat in said second position including means for retaining said elements in a predetermined telescoping relation one with the other when said seat lies in said second position.

23. A tree stand according to claim 22 wherein said retaining means includes a pin carried by one of said elements and an aperture in the other of said elements for receiving said pin and means for biasing said pin for movement in a direction for disposition in the aperture in the other of said elements.

24. A tree stand according to claim 22 wherein said seat includes a generally U-shaped element pivotally connected at its ends to said platform, said one telescopic element being pivotally connected to said platform at a location therealong between said one edge and the pivotal connection of said U-shaped element and said platform, said U-shaped element, when said seat is pivoted into said first position, overlying said platform with said telescoping elements extended relative to one another.

25. An aid for climbing a tree comprising:
a rigid frame including a pair of generally parallel side frame members spaced laterally one from the other and discrete front and back members;
said front member extending between said side members at a location inset from the ends of said side members along the front side of said frame;
said back member being releasably secured at opposite ends to said side members at selected positions therealong for adjustably spacing the back frame member relative to said front frame member whereby the frame may be disposed about trees of different girths with the front and back members on opposite sides of the tree;
each of said front and back members having a generally V-shaped surface for bearing against the tree to establish four laterally spaced points of contact therewith.

26. An aid according to claim 25 including resilient members disposed on each of said bearing surfaces for cushioning the aid against the tree.

27. An aid according to claim 25 wherein said back member and said side members have mutually cooperating guide surfaces enabling said back member to slide along said side members toward and away from said front member and substantially within the plane of said frame, and means carried by said side and back members for releasably locking said back member to said frame in selected adjusted positions therealong.

28. An aid according to claim 27 wherein said releasable locking means includes a pin carried by a leaf spring mounted on one of said side and back members and means defining an aperture on the other of said side and back members for receiving said pin.

29. An aid according to claim 25 including a harness carried by said frame adjacent the front of said frame for engaging behind and at least partially supporting an individual when climbing a tree.

30. An aid according to claim 29 wherein said harness is secured to the ends of said side members adjacent the front of said frame.

31. An aid for climbing a tree comprising:
a rigid frame including a pair of generally parallel side frame members spaced laterally one from the other and discrete front and back members;
said front member extending between said side members at a location inset from the ends of said side members along the front side of said frame;
said back member being releasably secured at opposite ends to said side members at selected positions therealong for adjustably spacing the back frame member relative to said front frame member whereby the frame may be disposed about trees of different girths with the front and back members on opposite sides of the trees; and said back member and said side members having mutually cooperating guide surfaces enabling said back member to slide along said side members toward and away from said front member and substantially within the plane of said frame, and means carried by said side and back members for releasably locking said back member to said frame in selected adjusted positions therealong.

32. An aid according to claim 31 wherein said releasable locking means includes a pin carried by a leaf spring mounted on one of said side and back members and means defining an aperture on the other of said side and back members for receiving said pin.

33. A tree stand comprising:
a platform having opposite edges with one edge engageable with a tree; ends to said
elongated means secured at its opposite platform and extendable about the tree for engagement with the other side of the tree from the platform and at an elevation above the elevation at which the one platform edge is engageable with the tree;
a seat carried by and upstanding from said platform and carrying a bracing element for engagement with the tree whereby the tree stand is engageable with the tree at three discrete locations affording support and stability to the stand; and
a safety rope for encircling the tree and engageable with said seat at its opposite ends to secure the stand to the tree, said rope including a Chinese knot and a pair of rope portions coupled thereto, said rope being responsive to tension applied to both rope portions to tighten the rope about the tree and responsive to tension applied to only one of said rope portions to provide slack in the rope when the latter encircles the tree.

34. A transportable combination tree stand and climbing aid comprising:
a platform;
a seat assembly carried by said platform and movable between a position upstanding from said platform and a collapsed position substantially overlying said platform;
means carried by said stand for securing said stand to a tree;
a climbing aid for assisting a climber to climb independently of said tree stand and including a frame for gripping the tree, said climbing aid frame overlying said platform when said seat lies in said collapsed position;
means carried by said platform for securing said frame and said platform one to the other when said seat is collapsed overlying said platform; and
means cooperable between said platform and said frame for engaging one another and locking said platform and frame against relative movement in one direction, and means interconnecting said platform and said frame for biasing said platform and said frame for relative movement in said one direction.

35. A tree stand comprising:
an elongated platform having opposite end edges with one end edge engageable with a tree;
elongated means including an elongated flexible band secured at its opposite ends to opposite sides of said platform, respectively, and extendable therefrom about the tree for engagement with the other side of the tree from the platform and at an elevation above the elevation at which the one platform edge is engageable with the tree;

means carried by said platform and engageable with said band at selected positions therealong for adjusting the extent of said band from said platform, said engageable means being located along said platform closer to said one end edge than the opposite and edge, said band extending from the opposite sides of said platform in a plane and being flexible when engaged with the tree for movement out of the plane; and a seat carried by said platform and movable between a first collapsed position adjacent said platform and a second position upstanding from said platform.

36. A tree stand according to claim 35 wherein said seat has a bracing element for engagement with the tree whereby the tree stand is engageable with the tree when said seat lies in said second position at three discrete locations affording support and stability to the stand.

37. A tree stand according to claim 35 including means spaced above said platform and located between said band extent adjusting means and said one end edge of said platform for engagement by the upper side of the feet of a climber, and means carried by the platform for engaging the heels of the climber and located between the opposite end edge of said platform and said band extend adjusting means.

38. A tree stand according to claim 35 wherein said platform is elongated and comprises a pair of elongated support members spaced laterally one from the other and extending along opposite sides of said platform between its opposite edges, said members comprised of channels having flanges and opening laterally inwardly toward one another, and a plurality of laterally extending, longitudinally spaced, support elements each having a generally rectilinear cross-section, the opposite ends of which are received within the channels of the members between said flanges.

39. A tree stand according to claim 37 wherein said platform is elongated and comprises a pair of elongated support members spaced laterally one from the other and extending along opposite sides of said platform between its opposite edges, said members comprised of channels having flanges and opening laterally inwardly toward one another, and a plurality of laterally extending, longitudinally spaced, support elements each having a generally rectilinear cross-section, the opposite ends of which are received within the channels of the members between said flanges.

* * * * *

UNITED STATES PATENT AND TRADEMARK OFFICE
CERTIFICATE OF CORRECTION

PATENT NO. : 4,802,552

DATED : February 7, 1989

INVENTOR(S) : Ralph Williams

It is certified that error appears in the above-identified patent and that said Letters Patent is hereby corrected as shown below:

Claim 1, line 3, delete "said"; line 4, after "to" insert --said--.
Claim 4, line 6, "and" should read --said--.
Claim 8, word ("to") bridging lines 2 and 3 should not be hyphenated.
Claim 12, line 14, "supporting" should read --support--.
Claim 33, line 3, delete "ends to said"; line 4, after "opposite" insert --ends to said--.
Claim 35, line 16, "and" should read --end--.
Claim 37, line 8, "extend" should read --extent--.

Signed and Sealed this

Seventeenth Day of April, 1990

Attest:

HARRY F. MANBECK, JR.

*Attesting Officer*      *Commissioner of Patents and Trademarks*